United States Patent
Tanaka et al.

(10) Patent No.: US 9,615,083 B2
(45) Date of Patent: Apr. 4, 2017

(54) DISPLAY DEVICE

(71) Applicant: Sharp Kabushiki Kaisha, Osaka-shi, Osaka (JP)

(72) Inventors: Noriyuki Tanaka, Osaka (JP); Takuya Sone, Osaka (JP); Kouji Kumada, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 345 days.

(21) Appl. No.: 14/364,370

(22) PCT Filed: Dec. 10, 2012

(86) PCT No.: PCT/JP2012/081953
§ 371 (c)(1),
(2) Date: Jun. 11, 2014

(87) PCT Pub. No.: WO2013/089067
PCT Pub. Date: Jun. 20, 2013

(65) Prior Publication Data
US 2014/0347453 A1  Nov. 27, 2014

(30) Foreign Application Priority Data

Dec. 15, 2011  (JP) .................................. 2011-274573

(51) Int. Cl.
*H04N 13/00* (2006.01)
*H04N 13/04* (2006.01)
(Continued)

(52) U.S. Cl.
CPC ......... *H04N 13/0409* (2013.01); *G09G 3/003* (2013.01); *G09G 3/36* (2013.01);
(Continued)

(58) Field of Classification Search
CPC . H04N 13/0409; H04N 13/0018; G09G 3/003
(Continued)

(56) References Cited

U.S. PATENT DOCUMENTS

| 6,573,928 B1 | 6/2003 | Jones et al. |
| 2009/0244266 A1* | 10/2009 | Brigham ................ G09G 3/003 348/51 |

(Continued)

FOREIGN PATENT DOCUMENTS

| JP | 2004-312780 A | 11/2004 |
| JP | 2006-018130 A | 1/2006 |

(Continued)

OTHER PUBLICATIONS

Wu, Yu- Jun., et al. "20.2: Stereoscopic 3D Display Using Patterned Retarder." SID Symposium Digest of Technical Papers. vol. 39. No. 1. Blackwell Publishing Ltd, 2008.*

(Continued)

*Primary Examiner* — Jeffrey Williams
(74) *Attorney, Agent, or Firm* — Keating & Bennett, LLP (57) ABSTRACT

The purpose of the present invention is to provide a display device in which the occurrence of the crosstalk can be suppressed. A display unit includes a display panel (12), a storage unit (54), a confirmation unit (56), and a correction unit (52). The display panel displays a synthetic image. The storage unit stores respective crosstalk levels set with respect to a plurality of areas (13a, 13b, 13c) that the display panel has. The confirmation unit that confirms in which one of the plurality of areas a pixel exists that displays an image that a viewer is supposed to see, among the plurality of images contained in the synthetic image. The correction unit reads the crosstalk level corresponding to the area, among the plurality of areas, in which the confirmation unit confirms the pixel displaying the image that a viewer is supposed to see exist, from the storage unit, and corrects the gray scale level data of the pixel displaying the image that a viewer is supposed to see, by using the crosstalk level.

16 Claims, 7 Drawing Sheets

(51) Int. Cl.
 G09G 3/00 (2006.01)
 G09G 3/36 (2006.01)
(52) U.S. Cl.
 CPC ....... *G09G 3/3666* (2013.01); *H04N 13/0018* (2013.01); *G09G 2320/0209* (2013.01); *G09G 2320/0271* (2013.01); *G09G 2320/0285* (2013.01); *H04N 13/0404* (2013.01); *H04N 13/0434* (2013.01)
(58) Field of Classification Search
 USPC .......................................................... 348/54
 See application file for complete search history.

(56) References Cited

U.S. PATENT DOCUMENTS

2009/0303157 A1  12/2009  Imai et al.
2011/0032340 A1*  2/2011  Redmann ........... H04N 13/0018
                                                   348/51
2011/0141130 A1   6/2011  Yagiura

FOREIGN PATENT DOCUMENTS

JP    2010-160383 A    7/2010
JP    2011-123403 A    6/2011
WO    2007/032132 A1   3/2007

OTHER PUBLICATIONS

Kao, Yung-Yuan, et al. "11.1: An Auto-Stereoscopic 3D Display Using Tunable Liquid Crystal Lens Array That Mimics Effects of GRIN Lenticular Lens Array." SID symposium digest of technical papers. vol. 40. No. 1. Blackwell Publishing Ltd, 2009.*
Official Communication issued in International Patent Application No. PCT/JP2012/081953, mailed on Mar. 12, 2013.

* cited by examiner

DISPLAY DEVICE

TECHNICAL FIELD

The present invention relates to a display device.

BACKGROUND ART

In recent years, a display device that includes a display panel and a parallax barrier has been proposed (see, for example, WO2007/32132, JP2004-312780A). The display panel displays synthetic images. A synthetic image is formed by dividing each of a plurality of images that are different from one another, and arraying the divisional pieces of the images in a predetermined order. The parallax barrier separates the plurality of images contained in the synthetic image so that they are visible from different directions. Such a display device is applied practically in, for example, a stereoscopic display of a digital camera, an on-vehicle dual-view display device, and the like.

In such a display device, however, such a phenomenon that when a viewer views one of a plurality of images, another image is visible to the viewer (i.e., crosstalk) occurs in some cases. This results in a problem that the image that the viewer is supposed to see is not clearly viewed by the viewer.

SUMMARY OF THE INVENTION

Problem to be Solved by the Invention

It is an object of the present invention to provide a display device in which the occurrence of the crosstalk can be suppressed.

A display device of the present invention includes: a display unit that displays a synthetic image formed by dividing each of a plurality of images that are different from one another and arraying the divisional images thus obtained in a predetermined order; and a separation unit that separates the plurality of images contained in the synthetic image, wherein the display unit includes: a display panel that displays the synthetic image; a storage unit that stores respective crosstalk levels set with respect to a plurality of areas that the display panel has; a confirmation unit that confirms in which one of the plurality of areas a pixel exists that displays an image that a viewer is supposed to see, among the plurality of images contained in the synthetic image; and a correction unit that reads the crosstalk level corresponding to the area, among the plurality of areas, in which the confirmation unit confirms the pixel displaying the image that a viewer is supposed to see exist, from the storage unit, and corrects the gray scale level data of the pixel displaying the image that a viewer is supposed to see, by using the crosstalk level.

In the case of the display device of the present invention, the occurrence of the crosstalk can be suppressed.

DETAILED DESCRIPTION OF THE EMBODIMENTS

A display device according to one embodiment of the present invention includes: a display unit that displays a synthetic image formed by dividing each of a plurality of images that are different from one another and arraying the divisional images thus obtained in a predetermined order; and a separation unit that separates the plurality of images contained in the synthetic image, wherein the display unit includes: a display panel that displays the synthetic image; a storage unit that stores respective crosstalk levels set with respect to a plurality of areas that the display panel has; a confirmation unit that confirms in which one of the plurality of areas a pixel exists that displays an image that a viewer is supposed to see, among the plurality of images contained in the synthetic image; and a correction unit that reads the crosstalk level corresponding to the area, among the plurality of areas, in which the confirmation unit confirms the pixel displaying the image that a viewer is supposed to see exist, from the storage unit, and corrects the gray scale level data of the pixel displaying the image that a viewer is supposed to see, by using the crosstalk level (the first configuration).

In the first configuration, crosstalk levels are set with respect to a plurality of areas that the display panel has, respectively. The crosstalk levels used for correcting gray scale level data correspond to areas where exist pixels that display an image that the viewer is supposed to see. As a result, appropriate crosstalk correction can be carried out.

The second configuration is the first configuration modified so that the display panel has a display area where the synthetic image is displayed, the display area includes the plurality of areas, and the confirmation unit confirms in which one of the plurality of areas the pixel displaying the image that a viewer is supposed to see exists, based on address data that indicate a position of the pixel in the display area.

The third configuration is the first or second configuration modified so that the correction unit corrects gray scale level data of the pixel displaying the image that a viewer is supposed to see, by the following equation (1):

$$I_O = I_X + (C+1) \times (I_M - I_X - I_Y - 1)/(I_M + 1) \qquad (1)$$

where
$I_X$ represents gray scale level data of the pixel displaying the image that a viewer is supposed to see,
$I_Y$ represents gray scale level data of a pixel serving as a factor that causes crosstalk,
$I_M$ represents a maximum value of the gray scale level data of the pixel displaying the image that a viewer is supposed to see,
C represents a crosstalk level, and
$I_O$ represents gray scale level data of the pixel after the correction.

The fourth configuration is any one of the first to third configurations modified so that the display unit includes a calculation unit that calculates gray scale level data of a pixel serving as a factor that causes crosstalk, based on gray scale level data of a pixel adjacent to the pixel displaying the image that a viewer is supposed to see. With the fourth configuration, it is possible to change the gray scale level data of the pixel serving as a factor that causes crosstalk to an appropriate value. As a result, appropriate crosstalk correction can be performed.

The fifth configuration is any one of the first to fourth configurations modified so that the display unit further includes a generation unit that generates the crosstalk level in the vicinities of a boundary of two adjacent areas among the plurality of areas. With the fourth configuration, it is possible to suppress an abrupt change of the crosstalk level at a boundary of two adjacent areas.

The sixth configuration is the fifth configuration modified so that the generation unit includes: a difference calculation unit that calculates a difference between the respective crosstalk levels set with respect to the two adjacent areas; a width setting unit that sets a width of a boundary belt area that includes a boundary between the two adjacent areas, and that extends along the boundary; a change rate calculation unit that calculates a crosstalk level change rate in the width direction of the boundary belt area by dividing the difference of the crosstalk levels calculated by the difference calculation unit by the width of the boundary belt area set by the width setting unit; and a crosstalk level setting unit that sets the crosstalk level based on the change rate calculated by the change rate calculation unit, and a position in the boundary belt area width direction of the pixel showing the image that a viewer is supposed to see. In the sixth configuration, the crosstalk level is set based on the crosstalk level change rate in the boundary belt area width direction, and a position in the boundary belt area width direction of a pixel displaying an image that a viewer is supposed to see. The crosstalk level gradually varies in the boundary belt area. As a result, the crosstalk level hardly exhibits an abrupt change at a boundary of two adjacent areas.

The seventh configuration is the sixth configuration modified so that the width setting unit changes the width of the boundary belt area according to the difference between the respective crosstalk levels set with respect to the two adjacent areas. In the seventh configuration, for example, in the case where there is a significant difference between crosstalk levels set with respect to two adjacent areas, the width of the boundary belt area can be increased. Therefore, the crosstalk level hardly exhibits an abrupt change at a boundary of the two adjacent areas.

A display device according to another embodiment of the present invention includes: a display unit that displays a synthetic image formed by dividing each of a plurality of images that are different from one another and arraying divisional images thus obtained in a predetermined order; and a separation unit that separates the plurality of images contained in the synthetic image, wherein the display unit includes: a display panel that displays the synthetic image; a storage unit that stores respective crosstalk levels set with respect to a plurality of areas in the display panel; a confirmation unit that confirms a position of a pixel displaying an image that a viewer is supposed to see, among the plurality of images contained in the synthetic image; a crosstalk level setting unit that sets a crosstalk level at the position of the pixel displaying the image that a viewer is supposed to see, based on the crosstalk levels stored by the storage unit and the position of the pixel displaying the image that a viewer is supposed to see; and a correction unit that corrects gray scale level data of the pixel displaying the image that a viewer is supposed to see, by using the crosstalk level set by the crosstalk level setting unit (the eighth configuration).

In the eighth configuration, based on the crosstalk levels set with respect to a plurality of portions of the display panel, respectively, and the position of the pixel displaying an image that a viewer is supposed to see, the crosstalk level at the position of the pixel displaying the image that a viewer is supposed to see is set. Using this crosstalk level, the gray scale level data of the pixel displaying the image that a viewer is supposed to see are corrected. In other words, the crosstalk level used for correction of the gray scale level data corresponds to the position of the pixel displaying the image that a viewer is supposed to see. As a result, appropriate crosstalk correction can be performed.

The ninth configuration is any one of the first to eighth configurations modified so that the storage unit stores: a first crosstalk level used for correcting gray scale level data of a pixel displaying an image that a viewer is supposed to see in a first direction; and a second crosstalk level used for correcting gray scale level data of a pixel displaying an image that a viewer is supposed to see in a second direction. In the ninth configuration, different crosstalk levels are used, for the case where gray scale level data of a pixel displaying an image that a viewer is supposed to see in the first direction are corrected, and for the case where gray scale level data of a pixel displaying an image that a viewer is supposed to see in the second direction are corrected. Here, the image that a viewer is supposed to see in the first direction is, for example, an image in three-dimensional display that a viewer is supposed to see with the left eye. The image that a viewer is supposed to see in the second direction is, for example, an image in three-dimensional display that the viewer is supposed to see with the right eye.

The tenth configuration is any one of the first to ninth configurations modified so that the storage unit stores the crosstalk levels set with respect to respective combinations of gray scale level data including the gray scale level data of the pixel displaying the image that a viewer is supposed to see and the gray scale level data of the pixel serving as the factor that causes crosstalk. In the tenth configuration, when the correction unit corrects gray scale level data, a crosstalk level corresponding to a combination of gray scale level data is used. As a result, more appropriate crosstalk correction can be performed.

The eleventh configuration is any one of the first to tenth configurations modified so that the display unit further includes a conversion unit that converts the gray scale level data into data of predetermined bits, and the correction unit corrects the gray scale level data using the data resulting from conversion by the conversion unit. In the eleventh configuration, even if gray scale level data are not a gray scale level value but a voltage value, a brightness value, or the like, the correction of the gray scale level data is facilitated.

The twelfth configuration is any one of the first to eleventh configurations modified so that the separation unit is a parallax barrier that separates the plurality of images contained in the synthetic image so that the plurality of images are visible from different directions, respectively.

The thirteenth configuration is any one of the first to eleventh configurations modified so that the separation unit is a lenticular lens that separates the plurality of images contained in the synthetic image so that the plurality of images are visible from different directions, respectively.

The fourteenth configuration is any one of the first to eleventh configurations modified so that the separation unit is a liquid crystal lens that separates the plurality of images contained in the synthetic image so that the plurality of images are visible from different directions, respectively.

The fifteenth configuration is any one of the first to eleventh configurations modified so that the separation unit is a partial retarder that separates the plurality of images contained in the synthetic image so that the plurality of images are visible from different directions, respectively.

Hereinafter, more specific embodiments of the present invention are explained with reference to drawings that show an example of the same. It should be noted that the drawings referred to hereinafter show, for convenience of explanation, only principal members necessary for the explanation of the present invention among the constituent members of the embodiments of the present invention are shown in a simplified manner. Therefore, the display device according to the present invention may include arbitrary constituent members that are not shown in the drawings that the present description refers to. Further, dimensions of members shown in each drawing do not faithfully reflect actual dimensions of constituent members and actual dimension ratios of the same.

[Embodiment 1]

Figure 1:
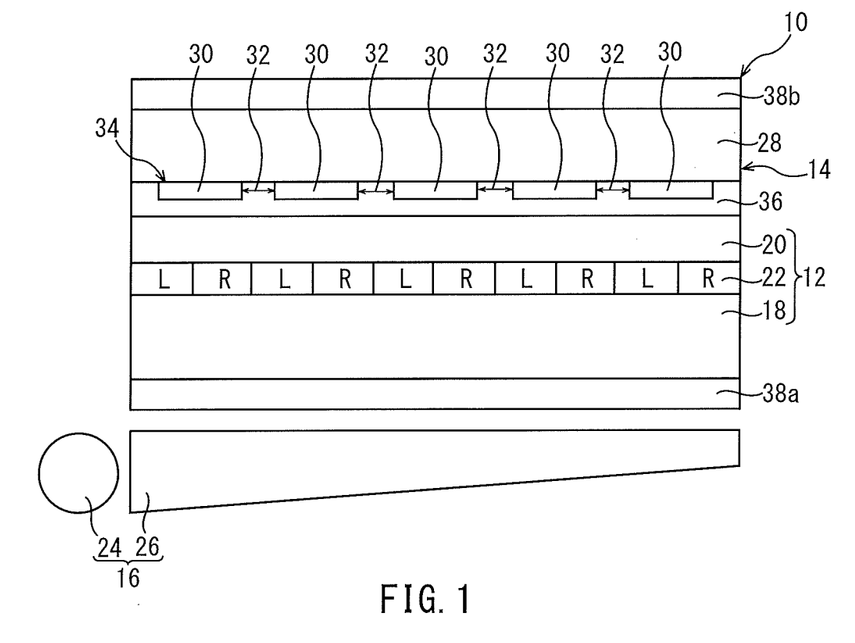
FIG. 1 schematically shows an exemplary schematic configuration of a display device as Embodiment 1 of the present invention.

FIG. 1 shows a display device 10 as Embodiment 1 of the present invention. The display device 10 includes a display panel 12, a barrier unit 14, and a backlight 16.

The display panel 12 is a liquid crystal panel. The display panel 12 includes an active matrix substrate 18, a counter substrate 20, and a liquid crystal layer 22 sealed between these substrates 18 and 20. The active matrix substrate 18 includes a plurality of pixel electrodes (not shown). The pixel electrodes are arranged in matrix. The counter substrate 20 includes a common electrode (not shown).

Figure 2:
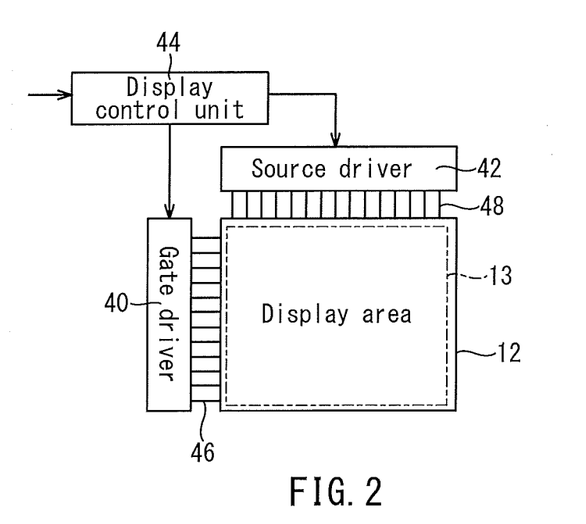
FIG. 2 is a block diagram showing an exemplary schematic configuration of a display unit.

The display panel 12 has a display area 13 (see FIG. 2). In the display area 13, a plurality of pixels are arranged in matrix. Each pixel includes a pixel electrode.

In the example shown in FIG. 1, columns of pixels R that display a right eye image, and columns of pixels L that display a left eye image are arranged alternately. In other words, in the example shown in FIG. 1, the right eye image and the left eye image are divided into pixel columns (in a stripe form). A synthetic image in which the pieces of the right eye image and the left eye image obtained by dividing the images in a stripe form are arranged alternately is displayed on the display panel 12.

Though not shown in the drawings, a color filter layer is formed on either one of the active matrix substrate 18 and the counter substrate 20. This imparts color properties to each pixel.

The backlight 16 is arranged on one side of the display panel 12 in the thickness direction. The backlight 16 includes a light source 24 and a reflection unit 26.

In the backlight 16, light emitted from the light source 24 is reflected by the reflection unit 26. As a result, light is projected to the display panel 12.

It should be noted that, the backlight 16 is not limited to the edge light type backlight shown in FIG. 1, but may be, for example, a direct backlight, a planar light source type backlight, or the like. Further, the light source 24 may be, for example, a cold-cathode tube, a light-emitting diode, or the like.

The barrier unit 14 is arranged on the other side of the display panel 12 in the thickness direction. It should be noted that the barrier unit 14 is arranged for performing light blocking/light transmission (separation of light projected from the backlight 16), and does not have to be arranged on the other side of the display panel 12 in the thickness direction. For example, the barrier unit 14 may be arranged between the display panel 12 and the backlight 16.

The barrier unit 14 includes a substrate 28. The substrate 28 is, for example, a glass substrate or the like.

The barrier unit 14 further includes a plurality of light-shielding layers 30. The light-shielding layer 30 is made of, for example, a photosensitive resin containing a black pigment.

The plurality of light-shielding layers 30 are formed in a stripe form so as to correspond to the columns of pixels R and L provided in the display panel 12. In other words, in the barrier unit 14, each light transmission slit 32 is formed between two adjacent light-shielding layers 30. In other words, the barrier unit 14 includes a parallax barrier 34 that serves as the separation unit in which the light-shielding layers 30 and the light transmission slits 32 are arrayed alternately.

Each light-shielding layer 30 blocks a part of light that has been emitted from the backlight 16 and has been transmitted by the display panel 12. This causes the columns of pixels R, which display the right eye image, to be observed by the right eye of a viewer, but not to be observed by the left eye of the viewer. Further, the columns of the pixels L, which display the left eye image, are caused to be observed by the left eye of the viewer, but not to be observed by the right eye of the viewer. As a result, the viewer is allowed to view a stereoscopic image.

Further, the barrier unit 14 includes a resin layer 36. The resin layer 36 is made of, for example, an ultraviolet curable resin, or the like.

The resin layer 36 is formed on the substrate 28. The resin layer 36 covers the light-shielding layers 30. The resin layer 36 bonds the barrier unit 14 and the display panel 12 with each other.

It should be noted that a polarizing plate 38a arranged on the active matrix substrate 18 in the present embodiment is bonded to the active matrix substrate 18, and a polarizing plate 38b arranged on the counter substrate 20 is bonded to the substrate 28.

Besides, as shown in FIG. 2, the display device 10 includes a gate driver 40, a source driver 42, and a display control unit 44, as the control unit of the display panel 12.

To the gate driver 40, a plurality of gate lines 46 are connected. These gate lines 46 are connected to gate electrodes (not shown) of thin film transistors (not shown) as switching elements, respectively. The thin film transistors are formed on the active matrix substrate 18. The gate lines 46 transmit scanning signals that are output from the gate driver 32. According to the scanning signals input to the gate electrodes, the thin film transistors are driven and controlled.

To the source driver 42, a plurality of source lines 48 are connected. These source lines 48 are connected to source electrodes (not shown) of the thin film transistors, respectively. The source lines 48 transmit display signals that are output from the source driver 42. When a display signal is input to the thin film transistor while the thin film transistor is being driven, charges according to the display signal are accumulated in an accumulation capacitor (not shown) connected to the thin film transistor. The accumulation capacitor is composed of a pixel electrode that is connected to a drain electrode (not shown) of the thin film transistor, a common electrode, and a portion of the liquid crystal layer 22 that is positioned between these electrodes. With charges according to the display signal being accumulated in the accumulation capacitor, the gray scale level of each pixel is controlled. As a result, an image is displayed on the display panel 12.

The display control unit 44 generates various types of signals necessary for image display, based on display data fed from the outside and timing signals, and outputs the same to the gate driver 40 and the source driver 42. The above-described synthetic image is generated by the display control unit 44.

In other words, in the present embodiment, the display panel 12 and the control unit of the display panel 12 (the gate driver 40, the source driver 42, and the display control unit 44) form a display unit.

Figure 3:
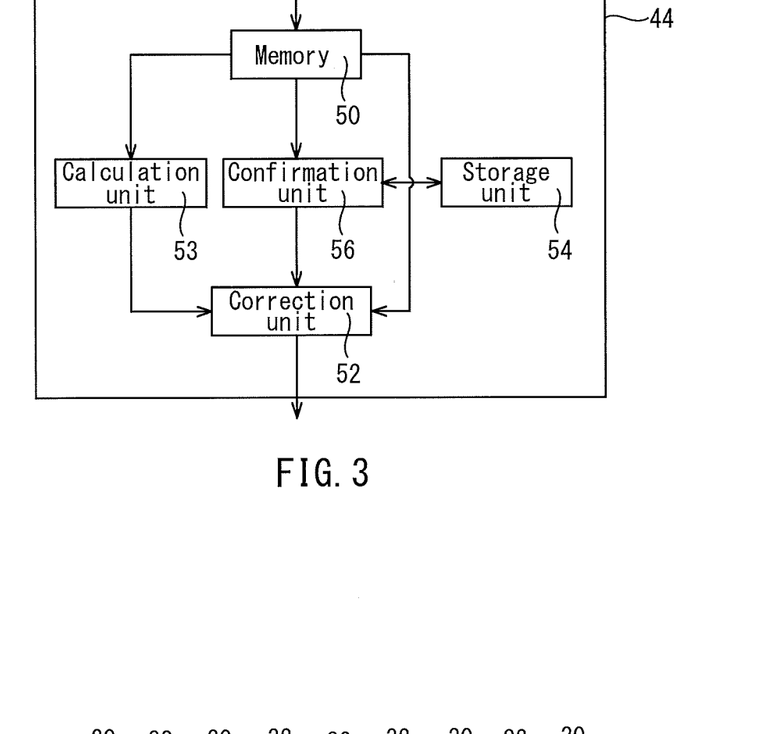
FIG. 3 is a block diagram showing an exemplary schematic configuration of a display control unit.

The display control unit 44 includes a memory 50, a correction unit 52, a calculation unit 53, a storage unit 54, and a confirmation unit 56, as shown in FIG. 3.

The memory 50 temporarily stores display data fed from outside. In the example shown in FIG. 3, the display control unit 44 includes one memory, but the display control unit 44 may have two memories, for example. In this case, one of the memories temporarily stores display data for displaying a left eye image. The other memory temporarily stores display data for displaying a right eye image. The display control unit 44 may have no memory.

The correction unit 52 corrects gray scale level data (a gray scale level value in the present embodiment) of pixels that display an image that a viewer is supposed to see, among a plurality of images contained in the synthetic image. This suppresses the occurrence of crosstalk. The crosstalk is a phenomenon that among a plurality of images contained in a synthetic image, an image other than an image that a viewer is supposed to see is visible to the viewer. The crosstalk occurs due to, for example, multiple reflection between layers in the display device 10, light leakage through the light-shielding layers 30 of the parallax barrier 34, and the like.

The correction unit 52 corrects gray scale level data of a pixel that displays an image that a viewer is supposed to see by using the following equation (1'):

$$Io_{Ln}=I_{Ln}+(C+1)\times(I_M-I_{Ln}-I'_{Rn}-1)/I_M+1) \tag{1'}$$

Here, $Io_{Ln}$ represents gray scale level data of a pixel $L_n$ after correction. $I_{Ln}$ represents gray scale level data of the pixel Ln. C represents a crosstalk level. $I_M$ represents a maximum value of gray scale level data of the pixel Ln. $I'_{Rn}$ represents gray scale level data (factor gray scale level data) of a pixel that is a factor that causes crosstalk. For example, in the case of 256 gray scale levels, $Io_{Ln}$, $I_{Ln}$, $I'_{Rn}$ and C are in a range of 0 to 255 each, and $I_M$ is 255.

The factor gray scale level data are generated, for example, based on gray scale level data of a pixel (pixel serving as a factor that causes crosstalk) that displays an image other than an image that a viewer is supposed to see, among a plurality of images contained in a synthetic image. The factor gray scale level data are generated by the calculation unit 53. The pixel serving as a factor that causes crosstalk is different depending on, for example, the positional relationship between the light-shielding layer and the light transmission slits that the parallax barrier has. In the present embodiment, a parallax barrier 34 in which the light-shielding layers 30 and the light transmission slits 32 are alternatively formed in the horizontal direction of the display screen (display area 13) of the display device 10 is used. Therefore, the pixels serving as factors that cause crosstalk are pixels that are positioned adjacent on both sides in the horizontal direction of the display screen (display area 13) of the display device 10 with respect to the pixels displaying an image that a viewer is supposed to see. In other words, in the present embodiment, pixels serving as factors that cause crosstalk are pixels adjacent on both sides in the row direction with respect to the pixels displaying an image that a viewer is supposed to see, among the pixels formed in matrix.

Figure 4:
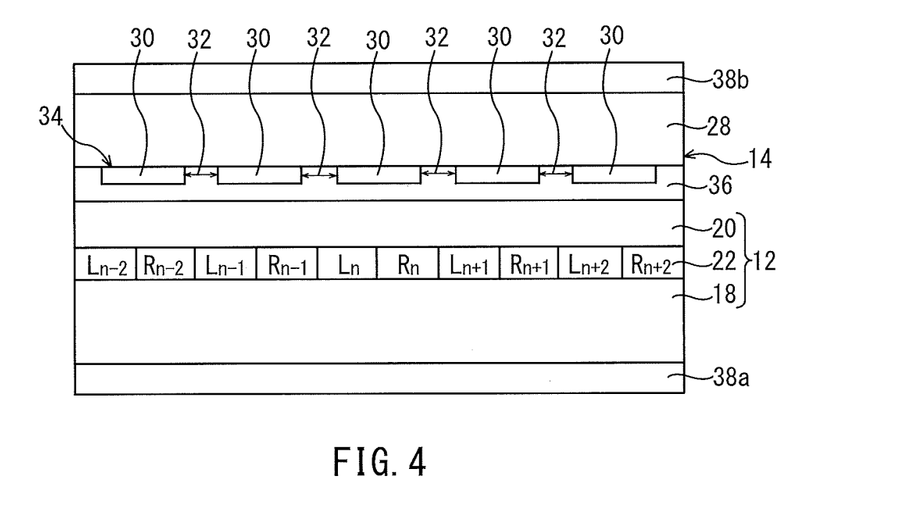
FIG. 4 is a schematic diagram for explaining pixels serving as factors that cause crosstalk.

For example, with respect to the pixel $L_n$ shown in FIG. 4, the pixel $R_{n-1}$ and the pixel $R_n$ positioned adjacent to the pixel $L_n$ are factors that cause crosstalk. Factor gray scale level data $I'_{Rn}$ used when crosstalk occurring to the pixel $L_n$ is correct are determined by, for example, the following equation (2):

$$I'_{Rn}=(I_{Rn-1}+I_{Rn})/2 \tag{2}$$

Here, $I_{Rn-1}$ represents gray scale level data of the pixel $R_{n-1}$. $I_{Rn}$ represents gray scale level data of the pixel $R_n$. In the case of, for example, 256 gray scale levels, $I_{Rn-1}$ and $I_{Rn}$ are in a range of 0 to 255 each.

In the case where each pixel has a plurality of subpixels (for example, a red pixel, a green pixel, and a blue pixel), the factor gray scale level data and the gray scale level data after correction are generated for each subpixel.

The storage unit 54 stores a plurality of crosstalk levels. The crosstalk levels are set with respect to a plurality of areas that the display area 13 has. In the example shown in FIG. 5, the display area 13 divided into three areas 13a, 13b, and 13c. The three areas 13a, 13b, and 13c are arrayed in the lateral direction (horizontal direction) of the display area 13. Crosstalk levels set with respect to the areas 13a, 13b, and 13c, respectively, are stored in the storage unit 54.

Figure 5:
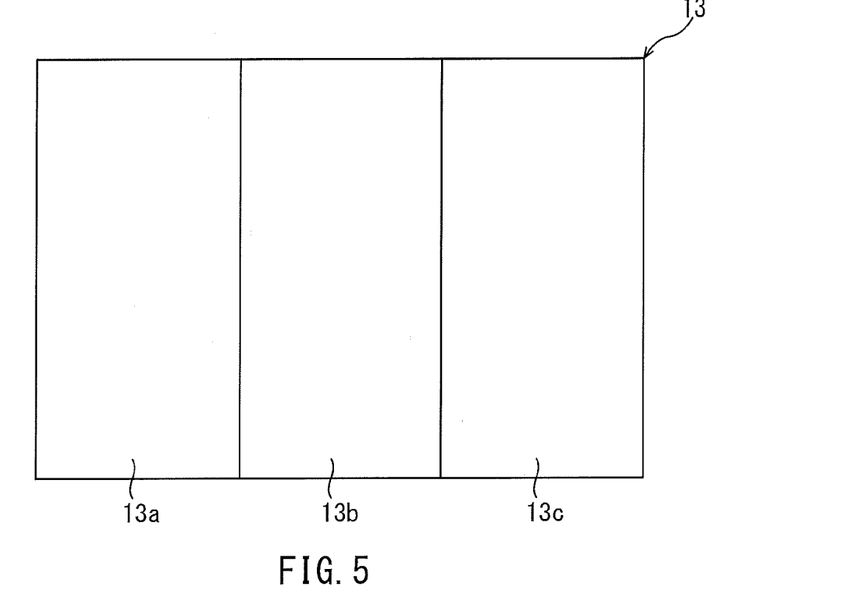
FIG. 5 schematically shows a display area.

Though FIG. 5 shows an example in which the display area 13 is divided in the horizontal direction alone, the area may be divided, for example, in the vertical direction alone, or in both of the vertical direction and the horizontal direction.

The confirmation unit 56 confirms in which one of the three areas 13a, 13b, 13c the pixels exist that display an image that a viewer is supposed to see, among a plurality of images contained in a synthetic image. The confirmation unit 56 confirms in which one of the areas 13a, 13b, 13c the pixels exist that display an image that a viewer is supposed to see, for example, based on address data that show positions of the pixels in the display area 13. The confirmation unit 56, after confirming the area where the pixels displaying an image that a viewer is supposed to see exist, reads a crosstalk level corresponding to the area, from the storage unit 54. The confirmation unit 56 provides the crosstalk level read from the storage unit 54 to the correction unit 52. The correction unit 52 corrects the gray scale level data by using the crosstalk level provided by the confirmation unit 56. This allows optimal crosstalk correction to be performed. As a result, further improvement of the display quality can be achieved.

The above-described equations (1') and (2) are used when the gray scale level data of the pixel L that displays a left eye image are to be corrected. Equations for correcting the gray scale level data of the pixel R that displays a right eye image are obtained by only replacing "R" and "L" with each other in the equations (1') and (2). Detailed explanation is omitted about the case where the gray scale level data of the pixel R that displays a right eye image are corrected.

The following description explains how the equation (1') is derived, in order to show the contents expressed by the equation (1').

First of all, let the crosstalk ratio be F, and then, the gray scale level data of pixels that are viewed by the left eye are expressed by the following equation (3):

$$I_L + (F \times I_R) \quad (3)$$

Here, $I_L$ represents a portion that results from gray scale level data $I_L$ of the pixels L displaying a left eye image, out of the gray scale level data of the pixels viewed by the left eye. $F \times I_R$ represents a portion that results from crosstalk, out of the gray scale level data of the pixels viewed by the left eye. In other words, $F \times I_R$ is a product obtained by multiplying the gray scale level data $I_R$ of the pixels R that display the right eye image by the crosstalk ratio F. F is in a range of 0 to 1.

Each display device 10 has its own F different from another, depending on, for example, the pitch between two adjacent light-shielding layers 30, 30 in the parallax barrier 34, the shape of the light-shielding layer 30, the material of the light-shielding layers 30, the positions where the light-shielding layers 30 are formed, the width of the light-shielding layer 30, the thickness of the light-shielding layer 30, the position relationship between the light-shielding layers 30 and the pixels R and L, etc. F can be determined by measurement for each display device 10. As a method for determining F, for example, the following method can be used: measuring the brightness of pixels viewed by the left eye when the pixels displaying the left eye image are displayed in black and the pixels displaying the right eye image are displayed in white; measuring the brightness of the pixels viewed by the left eye when both of the pixels displaying the left eye image and the pixels displaying the right eye image are displayed in black; and calculating F from difference between the brightnesses. F may be determined based on brightnesses measured at the center of each of the areas 13a, 13b, and 13c, or alternatively, based on average values of brightnesses measured at a plurality of positions in each of the areas 13a, 13b, and 13c.

F may be expressed as $C/I_M$. Let F be expressed as $C/I_M$, and then, the equation (3) is given as:

$$I_L + (C/I_M) \times I_R \quad (3')$$

In order to correct the gray scale level data of the pixels viewed by the left eye, which are expressed by the equation (3'), the correction as expressed by the following equation (4) has to be made. This intends to subtract a portion that results from influences of crosstalk preliminarily to correct the gray scale level data having been influenced by the crosstalk, so that the gray scale level data that are supposed to be displayed are obtained.

$$I_L - (C/I_M) \times I_R + (C/I_M) \times I_R = I_L \quad (4)$$

Therefore, the gray scale level data after correction can be expressed as the following equation (5):

$$I_L - (C/I_M) \times I_R \quad (5)$$

Here, in order to prevent the gray scale level data after correction from becoming negative, it is necessary to raise the gray scale level by C preliminarily. In other words, the range of the gray scale level data has to be changed to C to $I_M$. For example, in the case of 256 gray scale levels, the range of the gray scale level data has to be changed to C to 255. Let the result of raising $I_L$ by C be Ib, and Ib can be expressed by the following equation (6):

$$Ib = I_L \times ((I_M - C)/I_M) + C \quad (6)$$

Therefore, the gray scale level data Io after correction are obtained by substituting Ib of the equation (6) into $I_L$ of the equation (5), which are expressed by the following equation (7):

$$Io = Ib - (C/I_M) \times I_R = (I_M \times I_L - C \times I_L - C \times I_R)/I_M + C \quad (7)$$

Here, in order to avoid complication of circuits in the case where calculation is carried out by hardware, the equation (7) is approximated. Then, the equation (7) is transformed to:

$$Io + 1 = ((I_M + 1) \times (I_L + 1) - (C+1) \times (I_L + 1) - (C+1) \times (I_R + 1))/(I_M + 1) + (C+1) \quad (7')$$

The approximation of the equation (7) is carried out by adding 1 to Io, $I_M$, $I_L$, $I_R$ and C.

Calculation of the equation (7') gives:

$$Io + 1 = I_L + 1 + (C+1) \times (I_M - I_L - I_R - 1)/(I_M + 1) \quad (8)$$

The equation for determining Io from the equation (8) is given as:

$$Io = I_L + (C+1) \times (I_M - I_L - I_R - 1)/(I_M + 1) \quad (9)$$

Here, in the case of 256 gray scale levels, $I_M + 1$ is 256. Therefore, the equation (9) can be expressed as follows:

$$Io = I_L + (C+1) \times (I_M - I_L - I_R - 1) >> 8 \quad (10)$$

In the equation (10), ">>8" means right shift by 8 bits (division by 256).

The gray scale level data corrected by the correction unit 52 are expressed by the equation (9) or the equation (10). The factor gray scale level data are $I_R$ included in the second term of the equation (9) or the equation (10).

The above-described equations (3) to (10) are the questions in the case where the gray scale level data of the pixel L that displays a left eye image are corrected. Equations for correcting the gray scale level data of the pixel R that displays a right eye image are obtained by only replacing "R" and "L" with each other in the equations (3) to (10). Detailed explanation is omitted about the case where the gray scale level data of the pixel R that displays a right eye image are corrected.

[Application Example 1 of Embodiment 1]

Figure 6:
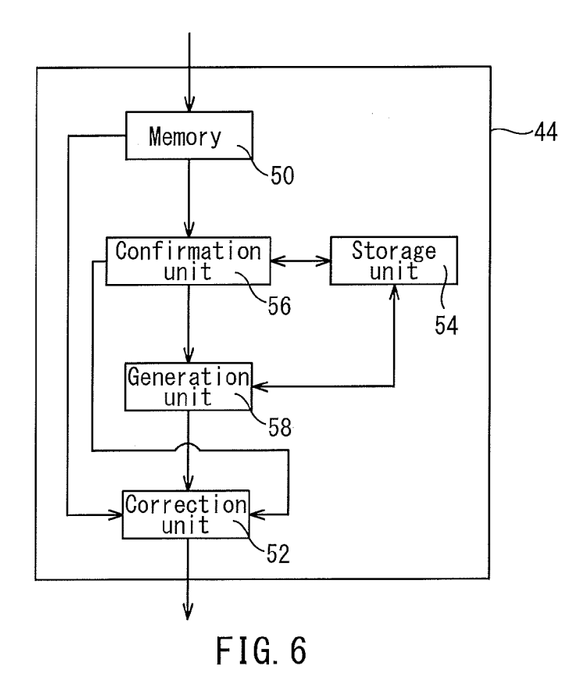
FIG. 6 is a block diagram showing another exemplary schematic configuration of the display control unit.

As shown in FIG. 6, the display control unit 44 may include a generation unit 58. The generation unit 58 generates a crosstalk level in the vicinity of a boundary between two adjacent ones of the three areas 13a, 13b, and 13c. When the confirmation unit 56 confirms that the pixels displaying an image that a viewer is supposed to see are present in the vicinity of a boundary between two adjacent areas, the generation unit 58 generates a crosstalk level to be used when gray scale level data of pixels displaying the image that a viewer is supposed to see are corrected.

Figure 7:
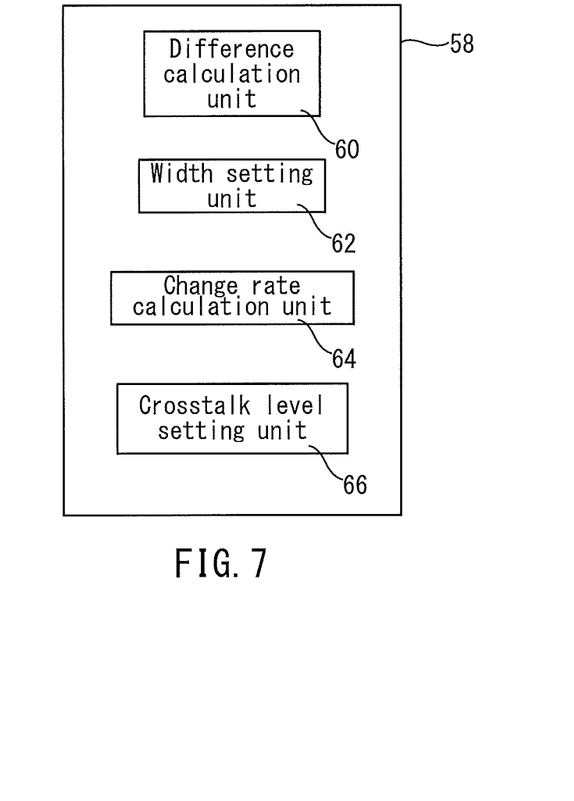
FIG. 7 is a block diagram showing another exemplary schematic configuration of the generation unit.

As shown in FIG. 7, the generation unit 58 includes a difference calculation unit 60, a width setting unit 62, a change rate calculation unit 64, and a crosstalk level setting unit 66.

The difference calculation unit 60 calculates a difference between crosstalk levels set with respect to the two adjacent areas. More specifically, the difference calculation unit 60 reads respective crosstalk levels set with respect to the two adjacent areas, out of a plurality of crosstalk levels stored in the storage unit 54, and calculates a difference between these.

Figure 8:
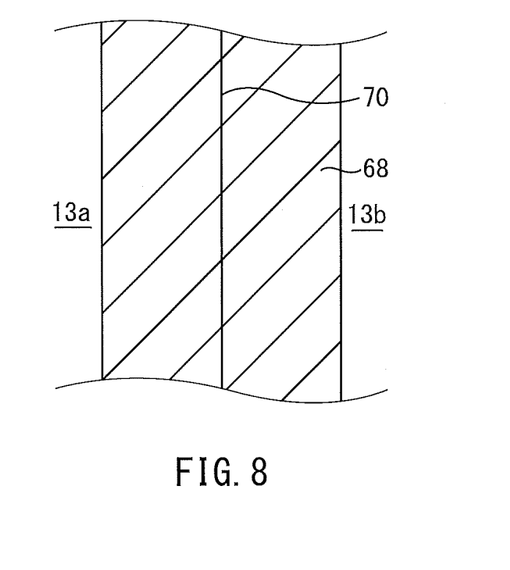
FIG. 8 schematically shows a boundary belt area of two adjacent areas.

The width setting unit 62 sets the width of a boundary belt area that extends along a boundary between two adjacent areas. FIG. 8 shows a boundary belt area 68 of the two adjacent areas 13a and 13b. As shown in FIG. 8, the boundary belt area 68 includes a boundary 70 between the two adjacent areas 13a and 13b. Ends of the boundary belt area 68 in the width direction extend in parallel with the boundary 70. The boundary 70 is positioned at the center of the boundary belt area 68 in the width direction. The width of the boundary belt area 68 is set, for example, according to the difference between crosstalk levels that are set with respect to the two adjacent areas, respectively. It is desirable that the width of the boundary belt area increases as the difference between the crosstalk levels that are set with respect to the two adjacent areas, respectively, increases. This reduces the crosstalk level change rate in the width direction of the boundary belt area. In the case where the display area 13 has a plurality of boundary belt areas, the widths of these boundary belt areas may be identical or different.

The change rate calculation unit 64 generates a crosstalk level change rate in the width direction of the boundary belt area by dividing the difference of the crosstalk levels set with respect to the two adjacent areas by the width of the boundary belt area. The difference between the crosstalk levels set with respect to the two adjacent areas is calculated by the difference calculation unit 60. The width of the boundary belt area is set by the width setting unit 62.

The crosstalk level setting unit 66 calculates a crosstalk level, based on the crosstalk level change rate in the width direction of the boundary belt area, and the position in the boundary belt area width direction of the pixel displaying an image that a viewer is supposed to see.

In the present application example, it is possible to suppress an abrupt change in the crosstalk level between two adjacent areas.

In the example shown in FIG. 6, the display control unit 44 does not include the calculation unit 53. In the example shown in FIG. 6, the correction unit 52 generates factor gray scale level data.

[Application Example 2 of Embodiment 1]

Figure 9:
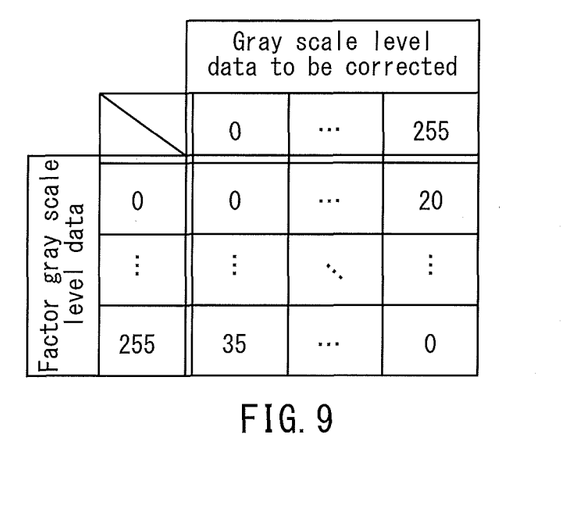
FIG. 9 is a table showing an exemplary relationship between combinations of gray scale level data and crosstalk levels.

In the present application example, the respective crosstalk levels of the areas 13a, 13b, and 13c are set according to combinations of gray scale level data (gray scale level data as correction targets) of pixels displaying an image that a viewer is supposed to see and factor gray scale level data (combinations of gray scale level data), respectively. FIG. 9 is a table that shows exemplary relationship between combinations of gray scale level data set with respect to the area 13a and crosstalk levels. Tables as shown in FIG. 9 are provided with respect to the areas 13a, 13b, and 13c, respectively. The storage unit 54 stores the tables provided with respect to the areas 13a, 13b, and 13c, respectively. The confirmation unit 56 generates factor gray scale level data. The confirmation unit 56 generates a crosstalk level based on the generated factor gray scale level data and gray scale level data of pixels displaying an image that a viewer is supposed to see. Here, the confirmation unit 56 refers to the tables stored in the storage unit 54. The confirmation unit 56 confirms in which area the pixels displaying an image that a viewer is supposed to see exist, and refers to the table corresponding to the area.

[Application Example 3 of Embodiment 1]

In the present application example, two crosstalk levels are set with respect to each of the areas 13a, 13b, and 13c. One of the two crosstalk levels (first crosstalk level) is used for correcting gray scale level data of pixels displaying an image that the left eye of a viewer is supposed to see (an image that the viewer is supposed to see in a first direction). The other crosstalk level (second crosstalk level) is used for correcting gray scale level data of pixels displaying an image that the right eye of the viewer is supposed to see (an image that the viewer is supposed to see in a second direction).

[Application Example 4 of Embodiment 1]

In the present application example, two types of crosstalk levels are set with respect to each of the areas 13a, 13b, and 13c. One of the two crosstalk levels (first crosstalk level) is used for correcting gray scale level data of pixels displaying an image that the left eye of a viewer is supposed to see (an image that the viewer is supposed to see in a first direction). The other crosstalk level (second crosstalk level) is used for correcting gray scale level data of pixels displaying an image that the right eye of the viewer is supposed to see (an image that the viewer is supposed to see in a second direction). A plurality of first crosstalk levels and a plurality of second crosstalk levels are set. The first crosstalk levels are set with respect to combinations of gray scale level data of pixels showing an image that the left eye of the viewer is supposed to see, and factor gray scale level data thereof, respectively. The second crosstalk levels are set with respect to combinations of gray scale level data of pixels showing an image that the right eye of the viewer is supposed to see, and factor gray scale level data thereof, respectively.

[Application Example 5 of Embodiment 1]

Figure 10:
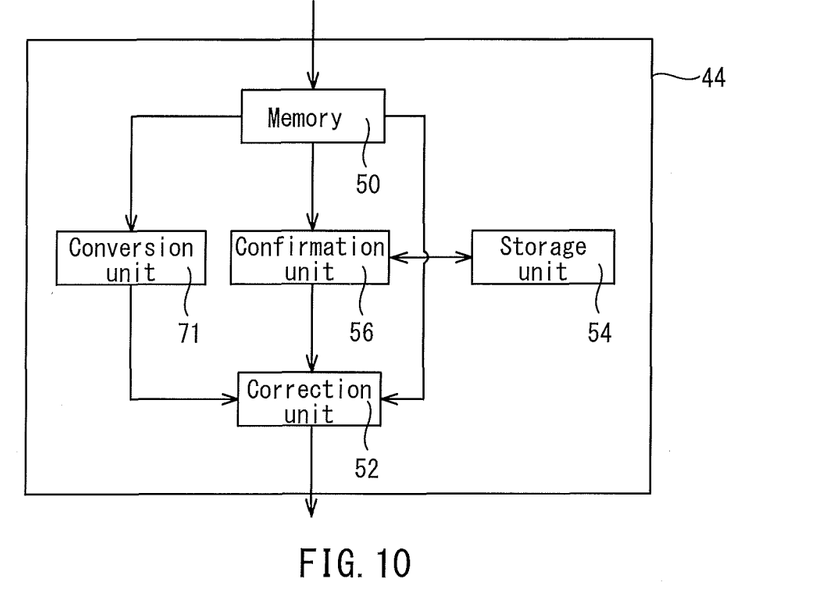
FIG. 10 is a block diagram showing another exemplary schematic configuration of the display control unit.

In the present application example, as shown in FIG. 10, display control unit 44 includes a conversion unit 71. The conversion unit 71 makes it possible to, in the case the gray scale level data are not a gray scale level value but, for example, a voltage value or a brightness value, to deal with the voltage value or the brightness value as data of predetermined bits (for example, 10 bits or 16 bits), so as to represent 256 gray scale levels (8 bits). The correction unit 52 corrects the gray scale level data by using the data changed by the conversion unit 71. In the example shown in FIG. 10, the display control unit 44 does not include the calculation unit 53. In the example shown in FIG. 10, the correction unit 52 generates factor gray scale level data.

[Application Example 6 of Embodiment 1]

Figure 11:
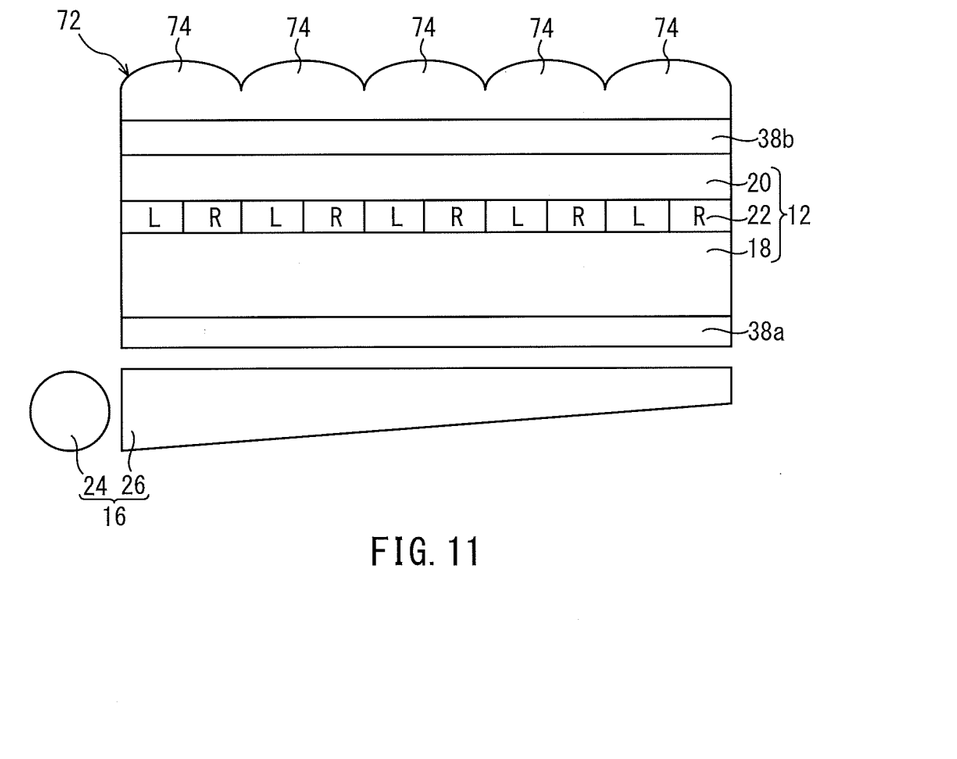
FIG. 11 schematically shows still another exemplary schematic configuration of the display device.

In the present application example, as shown in FIG. 11, a lenticular lens 72 as a separation unit is provided in place of the barrier unit 14. The lenticular lens 72 has a plurality of cylindrical lenses 74. The cylindrical lenses 74 are arranged in a direction in which the columns of the pixels R and the columns of the pixels L are arrayed alternately. The lenticular lenses 72 are bonded on the polarizing plate 38b. Here, the cylindrical lenses 74 are arranged at positions corresponding to the columns of the pixels R and L. It should be noted that, in the present application example, the polarizing plate 38b is bonded on the counter substrate 20.

[Application Example 7 of Embodiment 1]

Figure 12:
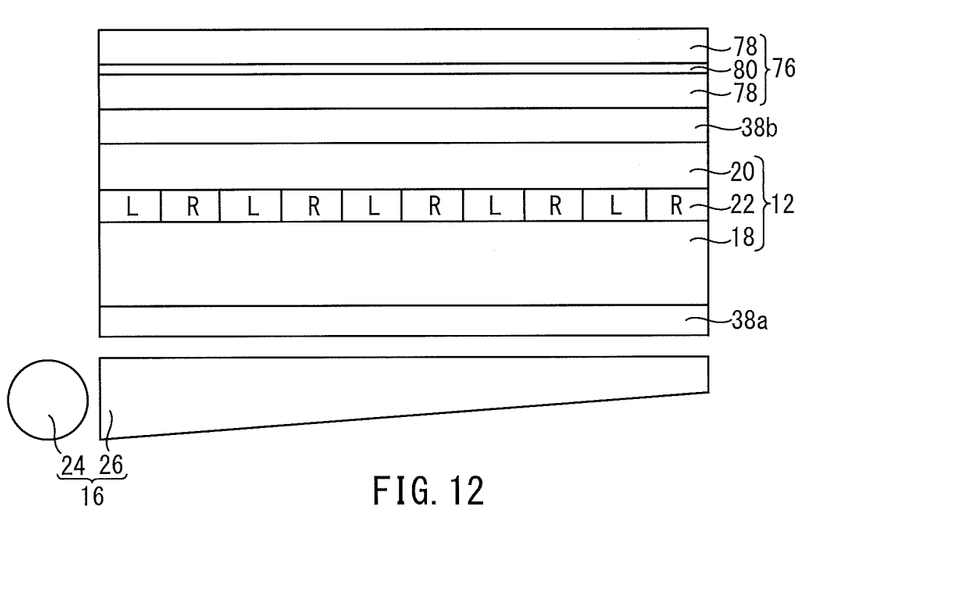
FIG. 12 schematically shows still another exemplary schematic configuration of the display device.

In the present application example, as shown in FIG. 12, a liquid crystal panel 76 is provided in place of the barrier unit 14. The liquid crystal panel 76 includes a pair of substrates 78, 78, and a liquid crystal layer 80 sealed between the same. A voltage is applied across the substrates 78, 78. This causes the refractive index of the liquid crystal layer 80 to change partially. As a result, a plurality of pseudo lenses (liquid crystal lenses) are formed in the liquid crystal layer 80. The lenses are formed in a direction in which the columns of pixels R and the columns of pixels L are arrayed alternately. The lenses are arranged at positions corresponding to the columns of the pixels R and L. The pseudo lenses formed in the liquid crystal layer 80 function as the separation unit.

[Application Example 8 of Embodiment 1]

Figure 13:
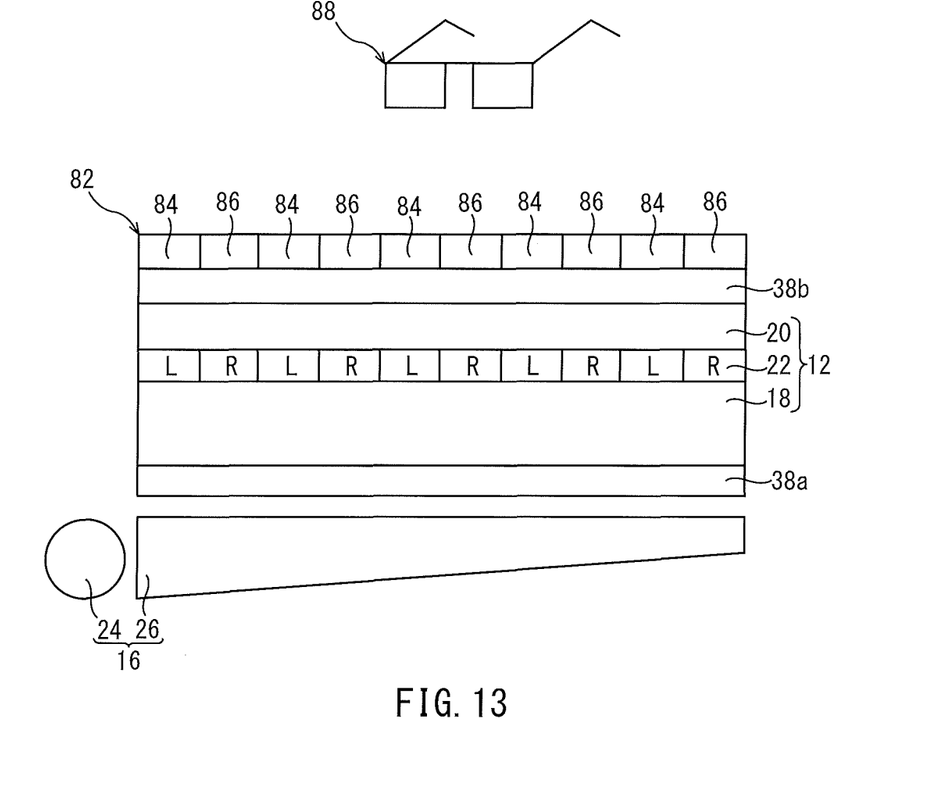
FIG. 13 schematically shows still another exemplary schematic configuration of the display device.

In the present application example, as shown in FIG. 13, a partial retarder 82 as the separation unit is arranged in place of the barrier unit 14. In other words, the present application example relates to a polarization-glass-type three-dimensional display device.

The partial retarder 82 includes a plurality of phase difference units 84 and a plurality of non-phase difference units 86. The phase difference units 84 and the non-phase difference units 86 are arrayed alternately. The phase difference unit 84 is a ½ wavelength plate, and rotates the polarization direction of incident light (linearly polarized light) by 90 degrees.

In the present application example, the pixels L displaying the left eye image are visible to a viewer through the phase difference units 84, and the pixels R displaying the right eye image are visible to the viewer through the non-phase difference units 86. The viewer only has to use the polarization glasses 88 so as to view the left eye image with the left eye alone, and view the right eye image with the right eye alone.

[Embodiment 2]

Figure 14:
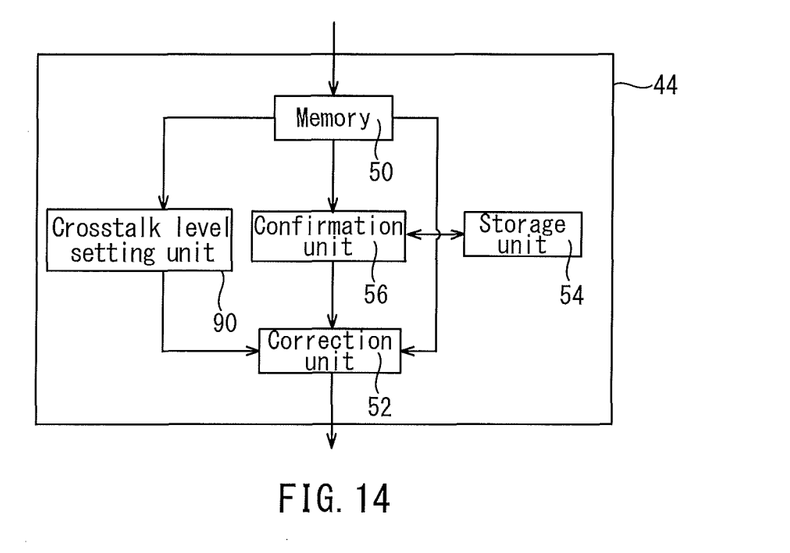
FIG. 14 is a block diagram showing an exemplary schematic configuration of a display control unit included in a display device as Embodiment 2 of the present invention.

In the present embodiment, as shown in FIG. 14, the display control unit 44 includes a crosstalk level setting unit 90. In the example shown in FIG. 14, the display control unit 44 does not include the calculation unit 53. In the example shown in FIG. 14, the correction unit 52 generates factor gray scale level data.

In the present embodiment, the storage unit 54 stores crosstalk levels that are set with respect to a plurality of positions in the display panel 12, respectively. The plurality of positions in the display panel 12 are, for example, the center and the four corners of the display panel 12.

In the present embodiment, the confirmation unit 56 confirms positions of pixels displaying an image that a viewer is supposed to see. The confirmation unit 56, for example, confirms positions of pixels displaying an image that a viewer is supposed to see, based on address data that indicate pixel positions in the display area 13.

In the present embodiment, the crosstalk level setting unit 90 sets crosstalk levels at positions of pixels displaying an image that a viewer is supposed to see, based on the crosstalk levels stored by the storage unit 54 and the positions of the pixels displaying the image that a viewer is supposed to see. The crosstalk level setting unit 90 sets the crosstalk levels, for example, by taking respective changing ratios of the crosstalk levels in the lateral and longitudinal directions of the display area 13 into consideration.

In the present embodiment, the correction unit 52 corrects gray scale level data of pixels displaying an image that a viewer is supposed to see, by using the crosstalk levels set by the crosstalk level setting unit 90.

So far Embodiments of the present invention have been described in detail, but these are merely examples and do not limit the present invention at all.

For example, a switching liquid crystal panel may be used in place of the barrier unit 14. The switching liquid crystal panel includes a pair of substrates, and a liquid crystal layer sealed between the pair of substrates. By applying a voltage across the pair of substrates, a parallax barrier (separation unit) is realized that has portions that transmit light (light transmission slits), and portions that blocks light (light-shielding layers). In the case where a switching liquid crystal panel is used, a planar image can be shown to a viewer when the parallax barrier is not realized. Further, in the case where a switching liquid crystal panel is used, a 3D display or a multiview display can be realized, even in the case where, for example, the orientation of the display device is changed from portrait (landscape) to landscape (portrait), in other words, whether the orientation of the display device is portrait or landscape.

The display panel may be, for example, a plasma display panel, an organic EL (Electro Luminescence) panel, an inorganic EL panel, or the like.

Pixels diagonally adjacent to pixels displaying an image that a viewer is supposed to see, for example, also may be regarded as the pixels serving as factors that could cause crosstalk.

The crosstalk levels do not have to be uniform in one area. For example, the crosstalk level may vary from the center of one area to outer edges thereof, or may vary from an end of an area in the width direction toward the other end thereof.

The factor gray scale level data do not have to be average of gray scale level data of pixels positioned adjacent on both sides to pixels displaying an image that a viewer is supposed to see. For example, the data may be obtained by multiplying gray scale level data of pixels positioned adjacent on both sides to pixels displaying an image that a viewer is supposed to see by a crosstalk contribution rates, and adding these.

The present invention is of course applicable to a display device that displays different images in a plurality of directions, respectively, by using a common display screen.

The invention claimed is:

1. A display device comprising:
   a display to display a synthetic image formed by dividing each of a plurality of images that are different from one another and arraying divisional images obtained in a predetermined order; and
   an image separator to separate the plurality of images contained in the synthetic image,
   wherein the display includes:
     a display panel to display the synthetic image;
     storage circuitry to store respective crosstalk levels set with respect to a plurality of areas included in the display panel;
     confirmation circuitry to confirm in which one of the plurality of areas a pixel exists that displays an image that a viewer is supposed to see, among the plurality of images contained in the synthetic image; and
     correction circuitry to read a crosstalk level corresponding to the area, among the plurality of areas, in which the confirmation circuitry confirms the pixel displaying the image that a viewer is supposed to see exists, from the storage circuitry, and correct gray scale level data of the pixel displaying the image that a viewer is supposed to see, by using the crosstalk level, wherein
     the correction circuitry corrects gray scale level data of the pixel displaying the image that a viewer is supposed to see, by the following equation (1):

$$l_o = l_x + (C+1) \times (l_m - l_x - l_y - 1)/(l_m + 1) \quad (1)$$

where
   $l_x$ represents gray scale level data of the pixel displaying the image that a viewer is supposed to see,
   $l_y$ represents gray scale level data of a pixel serving as a factor that causes crosstalk, $l_m$ represents a maximum value of the gray scale level data of the pixel displaying the image that a viewer is supposed to see, C represents a crosstalk level, and $l_o$ represents gray scale level data of the pixel after the correction.

2. The display device according to claim 1, wherein
the display panel has a display area where the synthetic image is displayed,
the display area includes the plurality of areas, and
the confirmation circuitry confirms in which one of the plurality of areas the pixel displaying the image that a viewer is supposed to see exists, based on address data indicating a position of the pixel in the display area.

3. The display device according to claim 1, wherein the display includes calculation circuitry to calculate gray scale level data of a pixel serving as a factor that causes crosstalk, based on gray scale level data of a pixel adjacent to the pixel displaying the image that a viewer is supposed to see.

4. The display device according to claim 1, wherein the display further includes generation circuitry to generate the crosstalk level in vicinities of a boundary of two adjacent areas among the plurality of areas.

5. The display device according to claim 4, wherein the generation circuitry includes:
difference calculation circuitry to calculate a difference between the respective crosstalk levels set with respect to the two adjacent areas;
width setting circuitry to set a width of a boundary belt area including a boundary between the two adjacent areas, and extending along the boundary;
change rate calculation circuitry to calculate a crosstalk level change rate in a width direction of the boundary belt area by dividing the difference of the crosstalk levels calculated by the difference calculation circuitry by the width of the boundary belt area set by the width setting circuitry; and
a crosstalk level setting circuitry to set the crosstalk level based on the change rate calculated by the change rate calculation circuitry, and a position in the boundary belt area width direction of the pixel showing the image that a viewer is supposed to see.

6. The display device comprising:
a display to display a synthetic image formed by dividing each of a plurality of images that are different from one another and arraying divisional images obtained in a predetermined order; and
an image separator to separate the plurality of images contained in the synthetic image,
wherein the display includes:
a display panel to display the synthetic image;
storage circuitry to store respective crosstalk levels set with respect to a plurality of areas included in the display panel;
confirmation circuitry to confirm in which one of the plurality of areas a pixel exists that displays an image that a viewer is supposed to see, among the plurality of images contained in the synthetic image; and
correction circuitry to read a crosstalk level corresponding to the area, among the plurality of areas, in which the confirmation circuitry confirms the pixel displaying the image that a viewer is supposed to see exists, from the storage circuitry, and correct gray scale level data of the pixel displaying the image that a viewer is supposed to see, by using the crosstalk level, wherein the display further includes generation circuitry to generate the crosstalk level in vicinities of a boundary of two adjacent areas among the plurality of areas,
the generation circuitry includes:
difference calculation circuitry to calculate a difference between the respective crosstalk levels set with respect to the two adjacent areas;
width setting circuitry to set a width of a boundary belt area including a boundary between the two adjacent areas, and extending along the boundary;
change rate calculation circuitry to calculate a crosstalk level change rate in a width direction of the boundary belt area by dividing the difference of the crosstalk levels calculated by the difference calculation circuitry by the width of the boundary belt area set by the width setting circuitry; and
crosstalk level setting circuitry to set the crosstalk level based on the change rate calculated by the change rate calculation circuitry, and a position in the boundary belt area width direction of the pixel showing the image that a viewer is supposed to see,
the width setting circuitry changes the width of the boundary belt area according to the difference between the respective crosstalk levels set with respect to the two adjacent areas.

7. The display device according to claim 1, wherein the storage circuitry stores:
a first crosstalk level used for correcting gray scale level data of a pixel displaying an image that a viewer is supposed to see in a first direction; and
a second crosstalk level used for correcting gray scale level data of a pixel displaying an image that a viewer is supposed to see in a second direction.

8. The display device according to claim 1, wherein the storage circuitry stores the crosstalk levels set with respect to respective combinations of gray scale level data including the gray scale level data of the pixel displaying the image that a viewer is supposed to see and the gray scale level data of the pixel serving as the factor that causes crosstalk.

9. The display device according to claim 1, wherein
the display further includes conversion circuitry to convert the gray scale level data into data of predetermined bits, and
the correction circuitry corrects the gray scale level data using the data resulting from conversion by the conversion circuitry.

10. The display device according to claim 1, wherein the image separator is a parallax barrier that separates the plurality of images contained in the synthetic image so that the plurality of images are visible from different directions, respectively.

11. The display device according to claim 1, wherein the image separator is a lenticular lens that separates the plurality of images contained in the synthetic image so that the plurality of images are visible from different directions, respectively.

12. The display device according to claim 1, wherein the image separator is a liquid crystal lens that separates the plurality of images contained in the synthetic image so that the plurality of images are visible from different directions, respectively.

13. The display device according to claim 1, wherein the image separator is a partial retarder that separates the plurality of images contained in the synthetic image so that the plurality of images are visible from different directions, respectively.

14. The display device according to claim 6, wherein the storage circuitry stores:
- a first crosstalk level used for correcting gray scale level data of a pixel displaying an image that a viewer is supposed to see in a first direction; and
- a second crosstalk level used for correcting gray scale level data of a pixel displaying an image that a viewer is supposed to see in a second direction.

15. The display device according to claim 6, wherein the storage circuitry stores the crosstalk levels set with respect to respective combinations of gray scale level data including the gray scale level data of the pixel displaying the image that a viewer is supposed to see and the gray scale level data of the pixel serving as the factor that causes crosstalk.

16. The display device according to claim 6, wherein
- the display further includes conversion circuitry to convert the gray scale level data into data of predetermined bits, and
- the correction circuitry corrects the gray scale level data using the data resulting from conversion by the conversion circuitry.

* * * * *